US007596605B2

(12) United States Patent
Sung et al.

(10) Patent No.: US 7,596,605 B2
(45) Date of Patent: Sep. 29, 2009

(54) SYSTEM AND METHOD FOR PROVIDING ELECTRONIC BUSINESS-CARD SERVICE USING OPEN SERVICE INTERFACE

(75) Inventors: Ki Soon Sung, Daejeon (KR); Yoo Mi Park, Daejeon (KR); Yong Joo Lee, Daejeon (JP); Jin Young Choi, Daejeon (KR); Young Il Choi, Daejeon (KR); Byung Sun Lee, Daejeon (KR); Kyung Pyo Jun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 597 days.

(21) Appl. No.: 11/253,379

(22) Filed: Oct. 19, 2005

(65) Prior Publication Data
US 2006/0136251 A1 Jun. 22, 2006

(30) Foreign Application Priority Data
Dec. 16, 2004 (KR) .................... 10-2004-0107228

(51) Int. Cl.
G06F 15/16 (2006.01)
G06F 15/173 (2006.01)
(52) U.S. Cl. .................. 709/206; 709/219; 709/224
(58) Field of Classification Search .............. 705/76, 705/10; 709/224, 204–207, 219; 455/440
See application file for complete search history.

(56) References Cited
U.S. PATENT DOCUMENTS
6,807,423 B1 * 10/2004 Armstrong et al. .......... 455/440

2002/0087353 A1 * 7/2002 Han .............................. 705/1
2003/0069746 A1 * 4/2003 Kuramatsu ................... 705/1
2004/0044910 A1 3/2004 Ylipieti
2006/0190591 A1 * 8/2006 Bobde et al. ................ 709/224

FOREIGN PATENT DOCUMENTS
| KR | 2002-0063994 | 2/2002 |
| KR | 20020043968 | 6/2002 |
| KR | 2003-0068105 | 8/2003 |
| KR | 10-20040050602 | 6/2004 |

OTHER PUBLICATIONS
vCard: The Electronic Business Card, A versit Consortium White Paper, Jan. 1, 1997, Version 2.1.*

* cited by examiner

Primary Examiner—Jackie Zuniga
(74) Attorney, Agent, or Firm—Ladas & Parry LLP

(57) ABSTRACT

Provided are a system and method for providing an electronic business card service using an open service interface. In the system, a business card information register receives electronic business card information from terminals of presentities who provide an electronic business card, and publishes it on an open service gateway, each of the electronic business card information including identification information and status information of each of the terminals and the terminals being connected to a convergence network; a watcher register receiving identification information of a terminal of a watcher who desires to use the electronic business card information and registers it to the open service gateway; and a business card information providing unit obtaining status information of a terminal of a specified presentity from the open service gateway and transmits it together with identification information of the terminal of the specified presentity to the terminal of the watcher, upon a request for electronic business card information of the specified presentity.

6 Claims, 4 Drawing Sheets

SYSTEM AND METHOD FOR PROVIDING ELECTRONIC BUSINESS-CARD SERVICE USING OPEN SERVICE INTERFACE

CROSS-REFERENCE TO RELATED PATENT APPLICATIONS

This application claims the priority of Korean Patent Application No. 10-2004-0107228, filed on Dec. 16, 2004, in the Korean Intellectual Property Office, the disclosure of which is incorporated herein in its entirety by reference.

BACKGROUND OF THE INVENTION

1. Field of the Invention

The present invention relates to a system and method for providing an electronic business card service using an open service interface, and more particularly, to a system and method for providing an electronic business card service using a presence and availability management application program interface (API) among open service interfaces capable of accessing a wire/mobile/Internet convergence network and performing a communication independently.

2. Description of the Related Art

Directories, such as that provided in Outlook® Express which is Microsoft's email program, and Haansoft's Haancom Directory, allow a user to search for the number of the other party's terminal to which a user's terminal is to be connected but do not provide the user with information regarding the status of the other party's terminal. Accordingly, in such a program, the contents of business cards used in an offline mode are stored in a computer and only information regarding the other party's terminal to be connected is read from the stored contents.

In messenger programs such as Microsoft's Messenger, information regarding the status of a user's terminal (online, offline, or away) is provided, but such a service is provided only when both the user's terminal and the other party's terminal are connected to a Messenger server.

SUMMARY OF THE INVENTION

The present invention provides a system and method for providing an electronic business card service using an open service interface, thereby allowing a user of an electronic business card (hereinafter, "watcher") to acquire the status of a terminal of a provider of the electronic business card (hereinafter, "presentity") and determine whether the watcher's terminal will be connected to the presentity's terminal.

According to one aspect of the present invention, there is provided an electronic business card service using an open service interface in a next-generation convergence network. The system includes: a business card information register receiving electronic business card information from terminals of presentities who provide electronic business cards and publishing the electronic business card information on an open service gateway, each of the electronic business card information including identification information and status information of the terminal of each presentity and the terminals being connected to the convergence network; a watcher register receiving identification information of a watcher who desires to use the electronic business card information from a terminal of the watcher, and registering the identification information to the open service gateway; and a business card information providing unit obtaining status information of a terminal of a specified presentity from the open service gateway, and transmitting the obtained status information together with identification information of the terminal of the specified presentity to a terminal of the watcher, upon a request for electronic business card information of the specified presentity from the watcher.

According to another aspect of the present invention, there is provided a method of providing an electronic business card service using an open service interface in a next-generation convergence network, the method including: receiving electronic business card information from terminals of presentities who provide electronic business cards and publishing the electronic business card information on an open service gateway, each of the electronic business card information including identification information and status information of each terminal and the terminals being connected to the convergence network; receiving identification information of a watcher who desires to use the electronic business card information from a terminal of the watcher and registering the identification information to the open service gateway; and obtaining status information of a terminal of a specified presentity from the open service gateway and transmitting the obtained status information together with identification information of the specified presentity to a terminal of a watcher, upon a request for electronic business card information of the specified presentity from the watcher.

Accordingly, the presentity can set the status, availability, and priority of his or her terminal using an open presence and availability interface, and the watcher can refer to both the number and current status of the other party's terminal, and thus easily make a call to the other party's terminal.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, exemplary embodiments of a system and method for providing an electronic business card service using an open service interface according to the present invention will be described in detail with reference the accompanying drawings.

Figure 1:
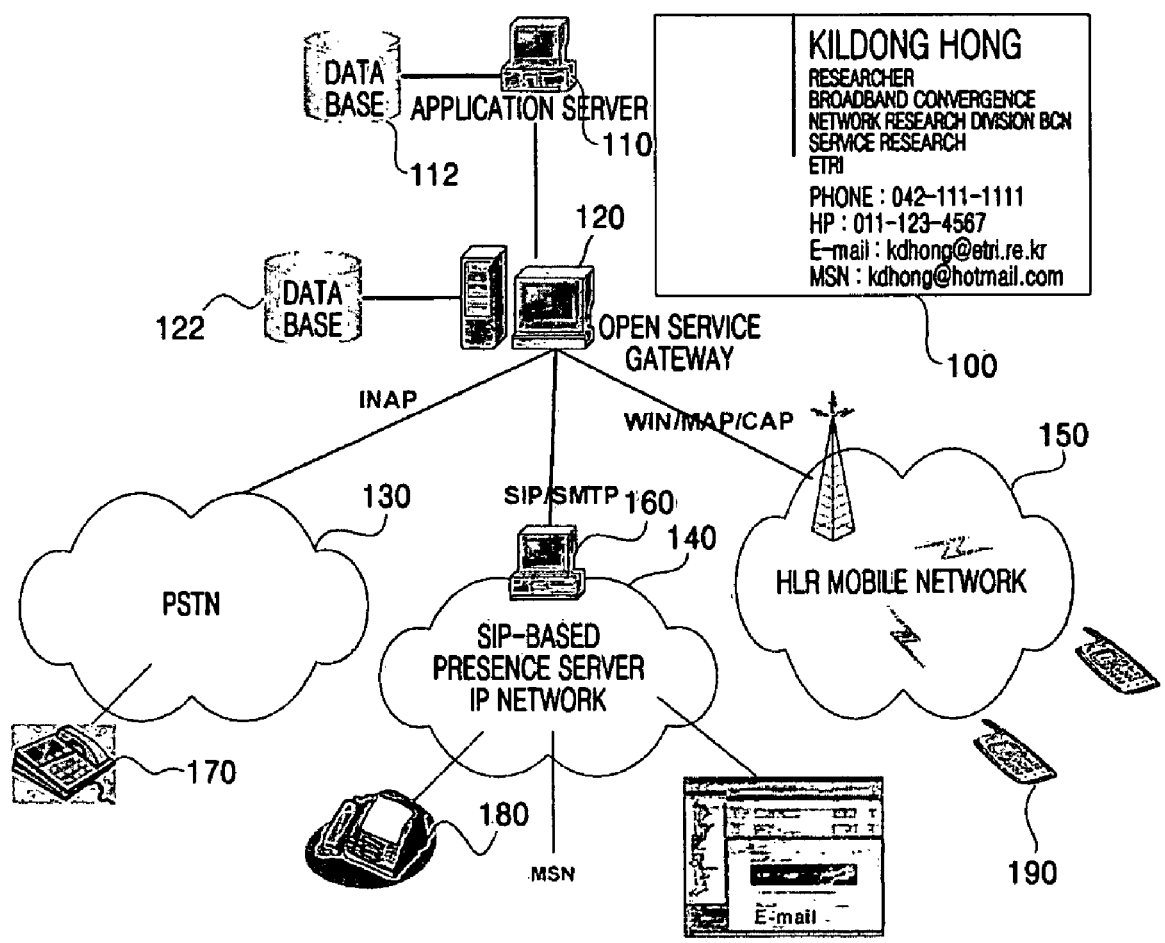
FIG. 1 illustrates an open service interface-based wire/mobile/Internet convergence network to which a system and method for providing an electronic business card service using an open service interface are applied, according to an embodiment of the present invention.

FIG. 1 illustrates an open service interface based wire/mobile/Internet convergence network to which a system and method for providing an electronic business card service using an open service interface are applied, according to an embodiment of the present invention. Referring to FIG. 1, the network includes an application server 110, an open service gateway 120, a public switched telephone network (PSTN) 130, the Internet 140, a mobile communications network 150, a presence server 160, a wire terminal 170, an Internet terminal 180, and a wireless terminal 190.

The application server 110 provides an environment that enables an open service interface for a presence and availability management service to be used in the network. Thus, the application server 110 includes a database 112 of an electronic business card service. The application server 110 is located at a service layer of a communications network and receives an application that uses an open application program interface (API). The application server 110 calls the API from the open service gateway 120 to provide an electronic business card service, and is called from the API of the open service gateway 120. The application server 110 is an embodiment of a system for providing an electronic business card service using an open service interface according to the present invention, and will later be described in greater detail.

The open service gateway 120 performs an open API upon a request from the application server 110. That is, the open service gateway 120 provides a standard API that allows service designers to access resources of the communications network, and controls the API and transforms it into a protocol of the communications network. Also the open service gateway 120 enables interworks with a wire network such as an Intelligent Network Application Part (INAP); a wireless network such as a Mobile Application Part (MAP) and a Wireless Intelligent Network (WIN) for a synchronous mobile network, and a Camel Application Part (CAP) for an asynchronous mobile network; and an Internet network such as a Session Initiation Protocol (SIP) and a Simple Mail Transfer Protocol (SMTP). The open service gateway 120 includes a database 122 that stores presence and availability management information.

The open service gateway 120 is connected to a terminal 100, such as a Personal Computer (PC), of a watcher to receive a request for an electronic business card service from the terminal 100 and transmit the request to the application server 110, and performs the open API upon request from the application server 110. The open API is a standard interface between an application service layer and a transfer network layer of the communications network, and is obtained through abstraction of the functions of the communications network. Use of the open API makes it possible to easily develop new application services, irrespective of the structures and technologies of communications networks (a wire telephone network, a mobile telephone network, a data communications network, a broadcast network, and so on). To support services using the open API, the open service gateway 120 includes a plurality of service interfaces which are referred to as Service Capability Functions (SCFs). Table 1 shows service interfaces in the open service gateway 120 and the functions of the service interfaces.

TABLE 1

| Service Interface | Function |
| --- | --- |
| Call Control | Definition of call control - basic call, multiple call, conference call, and multimedia call |
| User Interaction | Interaction with user, transmission of announcement, and SMS transmission |
| Mobility | Location & state information |
| Terminal Capabilities | User's terminal capabilities |
| Data Session Control | Data session control management |
| Generic Messaging | Processing of mails, MMS, and VMS |
| Connectivity Management | Offering and management of QoS |
| Account Management | Subscriber account management |
| Charging | Application and charging for use of data |
| Policy Management | Generation, changing, and management of policy information |
| Presence and Availability Management | Digital identity; presence state, entity state, and capabilities of agent; and security management |

Each service interface provides a unique service while being associated with a corresponding one of a mobile switching center, an Internet Protocol (IP) server, a charging server, a terminal information server, a Short Message Service (SMS) server, and a location information server which constitute for a mobile network. In particular, the presence server 160 processes and provides the presence information regarding the Internet terminal 180 connected to the open service gateway 120 via the Internet 140, based on the SIP.

A VoIP phone, an instance messaging service application, an E-mail application, and a soft SIP phone are installed into the terminal 100 so that the watcher can directly access the other terminals. The wire terminal 170, the Internet terminal 180, and the wireless terminal 190 of a provider of the electronic business card service are connected to the PSTN 130, the Internet 140, and the mobile communications network 150, respectively.

In this disclosure, the watcher is used to indicate a person who desires to obtain information regarding a terminal of a specified person using an electronic business card service, and the presentity is used to indicate a person who desires to publish information regarding his or her terminal using the electronic business card service.

The followings are definitions of terms related to the structure and elements of the wire/mobile/Internet convergence network based on the open service interface of FIG. 1.

In general, the term 'presence' has meanings of the state of being present, attendance, and current existence, and is used to indicate a separate entity in the field of communications services. In recent years, in the field of communications services, the term 'presence' has been used to indicate on/off information, user status provided in instant messenger programs, location information, and so on. In particular, in an electronic business card service according to the present invention, the presence of business card information must be understood as the status information of a terminal listed in a business card.

The term 'availability' indicates the quality of being connected to a communications unit in the field of communications services. When the connection to the communications unit is not allowed, there is no availability, and when the connection to the communications unit is allowed, there is availability.

Also, in the field of communications services, an open presence and availability interface is one of SCFs that the open service gateway 120 provides, and is a set of APIs provided to manage and control the presence and availability of the resources of the wire network/mobile network/Internet.

Figure 2:
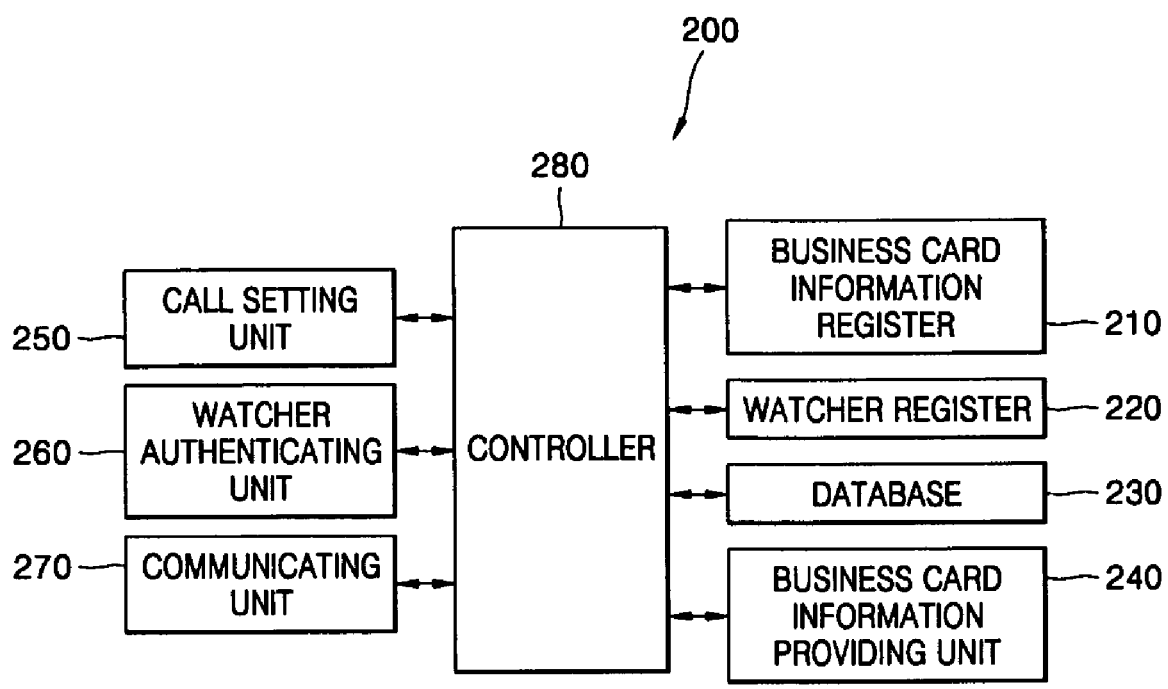
FIG. 2 is a detailed block diagram of a system for providing an electronic business card service using an open service interface, according to an embodiment of the present invention.

FIG. 2 is a detailed block diagram of a system 200 for providing an electronic business card service using an open service interface according to an embodiment of the present invention. Referring to FIG. 2, the system 200 includes a business card information register 210, a watcher register 220, a database 230, a business card information providing unit 240, a call setting unit 250, a watcher authenticating unit 260, a communicating unit 270, and a controller 280.

The business card information register 210 publishes electronic business card information of the terminals 170 through 190 of FIG. 1 which are connected to a wire/mobile/Internet convergence network on the open service gateway 120. The electronic business card information includes identification information and status information of each of the terminals 170 through 190, which are received from the terminals 170 through 190. The business card information register 210 is informed of a change in the status information from the terminals 170 through 190 in real time and updates the electronic business card information.

The watcher register 220 registers identification information of a watcher who desires to use the electronic business card information received from the terminal 100 of FIG. 1 with the open service gateway 120.

The database 230 stores the identification information of the watcher received from the electronic business card watcher, and the electronic business card information registered by a presentity. The electronic business card information specifies the title of the presentity, the identification information and status information of the terminals 170 through 190, and whether a process of allowing a right for use of the electronic business card information will be used.

Upon a request for the electronic business card information of a specified presentity from a registered watcher, the business card information providing unit 240 obtains the status information of the terminals 170 through 190 of the specified presentity from the open service gateway 120. The business card information providing unit 240 transmits the obtained status information together with the identification information of the terminals 170 through 190 to the terminal 100 of the registered watcher.

When receiving a request for connection of a call to the terminals 170 through 190 from the terminal 100 of the watcher, the call setting unit 250 sets a call among the terminal 100 and the terminals 170 through 190.

Upon a request for the electronic business card information regarding a specified presentity from the registered watcher, the watcher authenticating unit 260 transmits the identification information of the registered watcher to the terminals 170 through 190 and receives a right for use of the electronic business card information to be given to the registered watcher from the terminals 170 through 190. Such an operation of the watcher authenticating unit 260 is performed when the presentity sets such that the electronic business card information is provided to only a watcher who is registered to the open service gateway 120 and acquires the right for use of the electronic business card information. When the process of allowing a right for use of the electronic business card information is activated, the business card information providing unit 240 transmits the electronic business card information to the terminal 100 only when it is determined that the watcher authenticating unit 260 receives the right for use of the electronic business card information.

The communicating unit 270 enables the system 200 to exchange information with an external system including the open service gateway 120. The controller 280 controls the elements of the system 200. For the control, an operating program is installed in the controller 280.

Figure 3A:
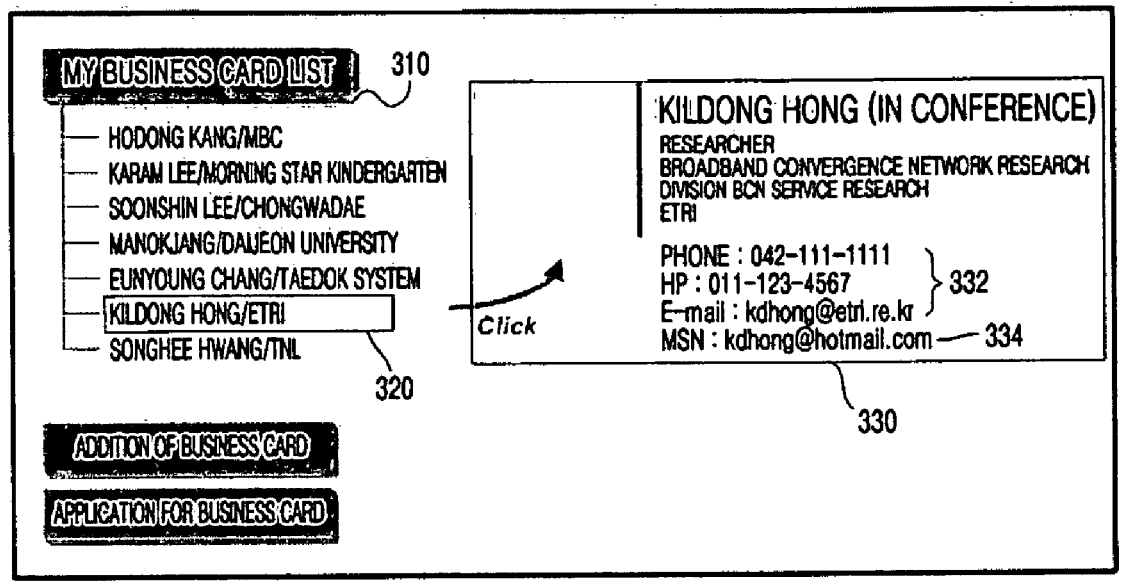
FIG. 3A illustrates a window that is an interface for a watcher to use an electronic business card service via an open service interface, the window being output to a terminal of the watcher, allowing the watcher to search for the business card of a specified person and make a call to the person, according to an embodiment of the present invention.

FIG. 3A illustrates a window that is an interface for a watcher to use an electronic business card service via an open service interface, the window being output to the terminal 100 of the watcher, allowing the watcher to search for the business card of a specified person and make a call to the person, according to an embodiment of the present invention. Referring to FIG. 3A, when the watcher clicks a specified person, e.g., Hong Kildong 320, from a my business card list 310, a window 330 showing detailed information regarding Hong Kildong 320 is displayed as a popup window. In FIG. 3A, reference numeral 332 denotes activated terminals to which the terminal 100 can be connected, and reference numeral 334 denotes a deactivated terminal to which the terminal 100 cannot be connected. If the watcher clicks one of the activated terminals 332 to be connected, a related application is activated or a request for call connection to the clicked, activated terminal 332 is transmitted to the application server 110 of FIG. 1 or the system 200 of FIG. 2, and then, call connection starts.

Figure 3B:
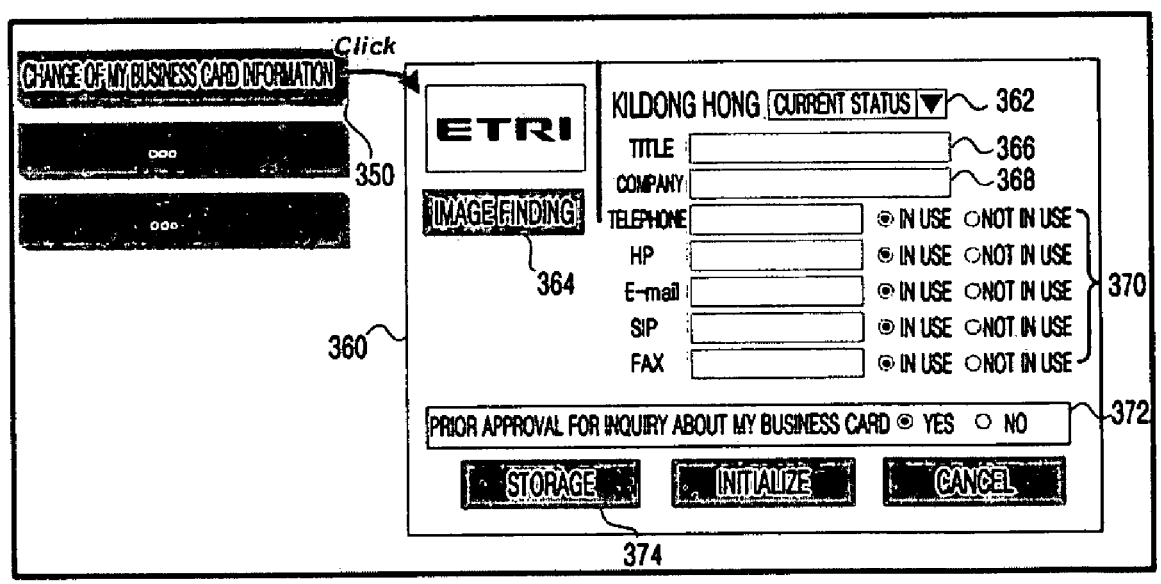
FIG. 3B illustrates a window that is an interface for a presentity to use an electronic business card service via an open service interface, the window being output to terminals of the provider, allowing the presentity to register or update the content of his/her electronic business card, according to an embodiment of the present invention.

FIG. 3B illustrates a window that is an interface for a presentity to use an electronic business card service via an open service gateway, the window being output to the terminals 170 through 190 of the presentity, allowing the presentity to register or update the content of his/her electronic business car, according to an embodiment of the present invention. Referring to FIG. 3B, when the presentity clicks a "change of my business card information" item 350, a window 360 showing detailed information regarding the business card of the presentity is displayed as a popup window. In the window 360, the presentity can change his/her state using a selection window 362, select a logo image to be included in the business card by clicking an "image finding" button 364, and describe the title, the company, and the number and status of terminals of the presentity in blanks 366, 368, and 370, respectively. Further, the presentity may determine whether a prior approval process will be performed in distributing the business card by clicking a section 372. When the presentity completes registering or updating of the business card and clicks a "store" button 374, the information regarding the business card is transmitted to the application server 110, and the application server 110 stores the received information to a storage unit of the application server 110 and publishes it on the open service gateway 120.

Figure 4:
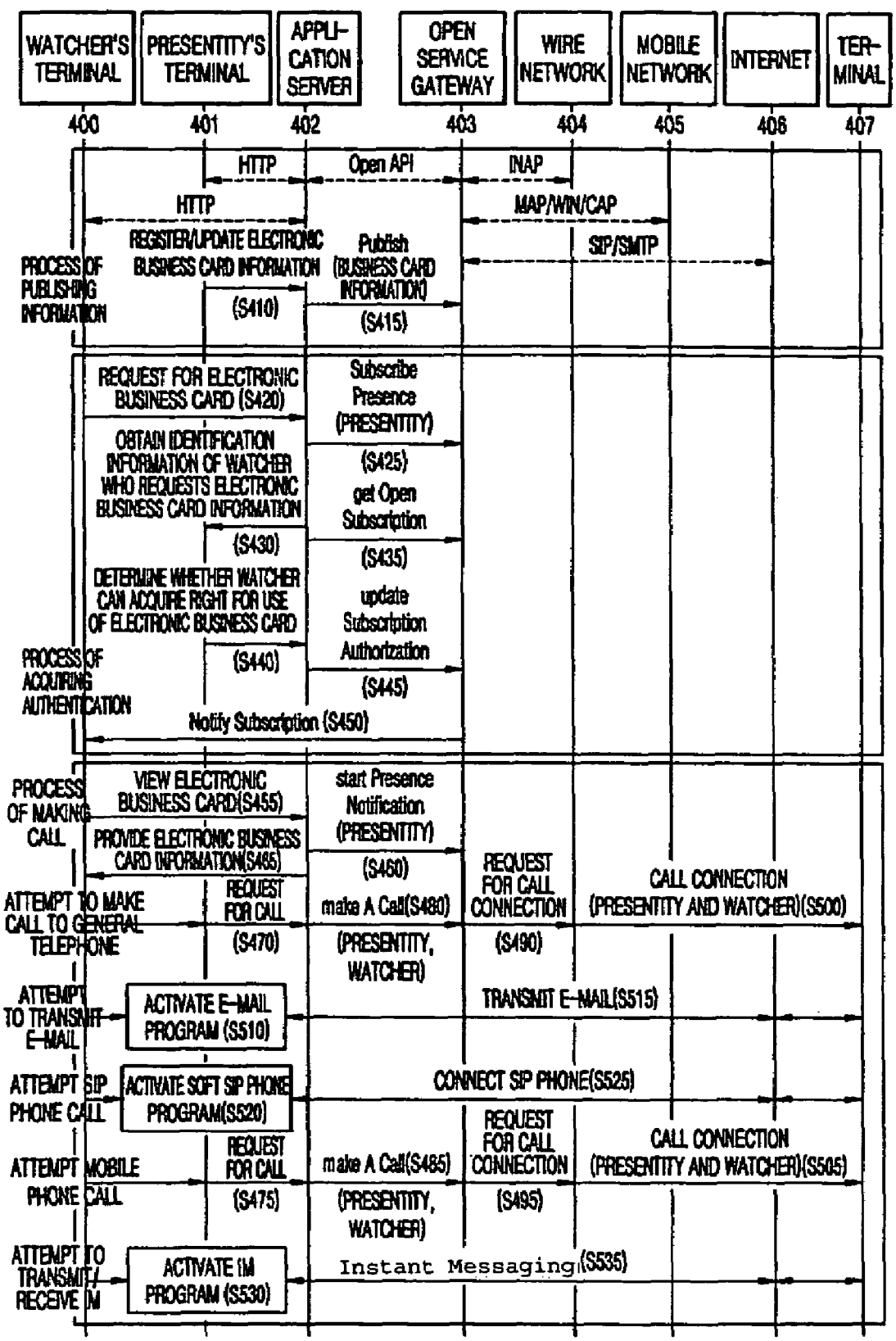
FIG. 4 is a flowchart of a method of providing an electronic business card service using an open service interface according to an embodiment of the present invention.

FIG. 4 is a flowchart of a method of providing an electronic business card service using an open service interface according to an embodiment of the present invention. Referring to FIG. 4, a HyperText Transfer Protocol (HTTP) is used as an interface between a terminal of a watcher 400 and an application server 402 and between a terminal of a presentity 401 and the application server 402, and an open API is used as an interface between the application server 402 and an open service gateway 403. The open service gateway 403 interworks with each network according to a protocol that a network business body provides. In this disclosure, it is assumed that an interface between the open service gateway 403 and a wire network 404 is the INAP; an interface between the open service gateway 403 and a mobile network is the MAP, the WIN, or the CAP; and an interface between the open service gateway 403 and the Internet 406 is the SIP or the SMTP.

Referring to FIG. 4, the presentity registers electronic business card information to the application server 402 or updates electronic business card information stored in the application server 402, using an electronic business card program installed in the terminal 401 (S410). Next, the application server 402 publishes the electronic business card information on the open service gateway 403 (S415). Here, the electronic business card information includes the number and status of the terminal 401 connected to a convergence network of the wire network 404, the mobile network 405, and the Internet 406, which the presentity desires to describe in his/her business card. For convenience, FIG. 4 illustrates that a terminal that the presentity uses to register the electronic business card to the application server 402 is the same as that described in the electronic business card, but they may be different terminals.

As it demands, when registering or changing the electronic business card information, the presentity may set on/off information of a terminal, and determine priority of terminals of the presentity according to the degree of convenience of each terminal to be connected. Also, the presentity may set such that the electronic business card information includes an option that determines whether a process of authenticating a watcher who desires to use the electronic business card information will be performed before allowing the watcher to use the electronic business card information. For instance, when the presentity distributes the electronic business cards to a plurality of unspecified persons for business reasons, the electronic business card information of the presentity may be disclosed to them without authentication. Otherwise, the electronic business card information may be disclosed to only specified watchers through authentication.

Next, the watcher requests the application server 402 to provide the electronic business card information of a specified presentity, using an electronic business card program installed in the terminal 400 (S420). The application server 402 requests the open service gateway 403 to transmit the requested electronic business card information to the terminal 400 of the watcher (subscribePresence) (S425). Next, the application server 402 obtains the identification information of the watcher who requests the electronic business card information from the open service gateway 403 (getOpenSubscription) (S430). Next, the application server 402 transmits the identification information of the watcher to the terminal 401 of the presentity (S435).

Next, the presentity determines the identification of the watcher from the identification information received from the application server 402, determines whether the watcher can acquire a right for use of the electronic business card, and transmits the result of determination to the application server 402 (S440). Thereafter, the application server 402 informs the open service gateway 403 of the result of determination (updateSubscriptionAuthrization) (S445). Then, the open service gateway 403 transmits the result of determination to the terminal 400 of the watcher (notifySubscription) (S450). The watcher can view the result of determination output to the terminal 400 and determine whether he or she can read the electronic business card information of the presentity. Operations S430 through S450 are performed when the presentity sets such that the electronic business card information is to be provided to the watcher after authentication. If the presentity sets not to perform authentication, the right for use of the electronic business card information is given to the watcher without authentication.

Next, the watcher can view the electronic business card of the specified presentity using the electronic business card program installed in the terminal 400. When the watcher searches for the specified presentity or selects the specified presentity from a directory using the terminal 400, and requests the application server 402 to provide the electronic business card information of the specified presentity (S455), the application server 402 acquires the status information of the terminal 401 of the specified presentity from the open service gateway 403 (startNotificationPresence) (S460). Next, the application server 402 transmits the acquired status information together with the number of the terminal 401 to the terminal 400 (S465). Even if the status of the terminal 401 changes, it is possible to reflect the change in the status information according to the present invention.

During searching for the electronic business card information, the watcher may make a call to a terminal 407 described in the electronic business card. The terminal 407 may be the same as the terminal 401. If the terminal 407 is a general telephone or a mobile phone, a VoIP Phone application installed in the terminal 400, e.g., a PC, is activated, and connection of a call to the terminal 407 is attempted (S470 and S475). Upon a request for call connection, the application server 402 calls a makeACall( ) operation of a third party call of the Parlay X API to connect a call between the terminal 400 and the terminal 407 (S480 and S485). In this case, the INAP for a telephone, and the MAP, the WIN, or the CAP for a mobile phone can be used as network protocols. Next, the open service gateway 403 requests the wire network 404 or the wireless network 405 to connect a call between the terminal 400 and the terminal 407 (S490, S495), and a switchboard connected to the wire network 404 or the wireless network 405 connects a call between the terminal 400 and the terminal 407 (S500 and S505).

If the watcher attempts to transmit an electronic mail, an electronic mail program installed in the terminal 400 of the watcher is activated (S510). Then, the watcher makes an electronic mail and transmits it to the terminal 407 via the Internet 406 (S515). If the watcher attempts to make an SIP phone call, a soft SIP phone program installed in the terminal 400 is activated (S520). Then, the SIP phone call is connected between the terminal 400 and the terminal 407 using the SIP via the Internet 406 (S525). Here, the SMTP is used to transmit the electronic mail, and the SIP is used to make the SIP phone call. If the watcher attempts to transmit or receive a short message, an instant messaging program stored in the terminal 400 is activated (S530) and enables exchange of short messages between the terminal 400 and the terminal 407 instantly (S535).

The present invention can be embodied as a computer readable code in a computer readable medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as a computer readable code in the distributed system.

In a system and method for providing an electronic business card service using an open service interface according to an embodiment of the present invention, a presentity provides presence and availability information of a terminal to be included in the presentity's business card, and a watcher acquires a prior approval for use of the business card of the presentity, searches for the business card, and makes a call to an available terminal described in the business card. Therefore, the presentity can set the statuses, availabilities, and priority for his/her terminals according to a schedule, using an open presence and availability interface. Thus, it is possible to increase the success rate of connecting a call of the watcher to a terminal of the presentity, and update the content of the business card, e.g., the number of a terminal and the title of the presentity, in real time. The watcher can refer to the latest electronic business card information of the presentity, e.g., the latest number and status of the terminal of the presentity, thereby increasing the success rate of connecting a call to the presentity.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A system for providing an electronic business card service using an open service interface in a next-generation convergence network, the system comprising:
    an open service gateway including a presence and availability management service interface and comprising a database including presence and availability management information;
    an application server including a database of the electronic business card service, wherein an open application program interface is used as an interface between the application server and the open service gateway, the application server comprising:
    business card information register receiving electronic business card information from terminals of presentities who provide electronic business cards and the application server publishes the electronic business card information on the open service gateway, each of the electronic business card information including identification information and status information of the terminal of each presentity and the terminals being connected to the convergence network;
    a watcher register receiving identification information of a watcher who desires to use the electronic business card information from a terminal of the watcher, and registering the identification information to the open service gateway;
    a business card information providing unit obtaining status information of a terminal of a specified presentity from the open service gateway, and transmitting the obtained status information together with identification information of the terminal of the specified presentity to a terminal of the watcher, wherein the status information is obtained from the open service gateway upon a request for electronic business card information of the specified presentity from the watcher and is transmitted with the identification information of the terminal of the presentity to the terminal of the watchers; and
    a watcher authenticating unit transmitting identification information of the watcher to the terminal of the specified presentity, wherein the specified presentity determines whether the watcher can acquire a right for use of the electronic business card, and the watcher authenticating unit receiving the right for use of the electronic business card information, which is to be provided to the watcher, from the terminal of the specified presentity, upon a request for electronic business card information of the specified presentity from the watcher,
    wherein the business card information providing unit transmits the electronic business card information of the specified presentity to the terminal of the watcher when it is determined that the watcher authenticating unit receives the right for use of the electronic business card information.

2. The system of claim 1, further comprising a call setting unit setting a call between the terminal of the watcher and the terminal of the specified presentity upon a request for connection of a call to the terminal of the specified presentity from the terminal of the watcher.

3. The system of claim 1, wherein the electronic business card information specifies a title of the specified presentity, identification of the terminal of the specified presentity, and whether a process of assigning the right for use of the electronic business card information to the watcher is to be used.

4. A method of providing an electronic business card service by an application server connected to an open service interface in a next-generation convergence network, the method comprising:
    (a) receiving electronic business card information from terminals of presentities who provide electronic business cards and the application server publishing the electronic business card information on an open service gateway, each of the electronic business card information including identification information and status information of each terminal and the terminals being connected to the convergence network, wherein the application server includes a database of the electronic business card service and is connected to the open server gateway via an open application program interface, the open service gateway having a presence and availability management service interface and comprising a database including presence and availability management information;
    (b) receiving identification information of a watcher who desires to use the electronic business card information from a terminal of the watcher and registering the identification information to the open service gateway; and
    (c) obtaining status information of a terminal of a specified presentity from the open service gateway and transmitting the obtained status information together with identification information of the specified presentity to a terminal of a watcher, the status information being obtained from the open service gateway upon a request for electronic business card information of the specified presentity from the watcher and transmitted with the identification information to the terminal of the watcher;
    (d) transmitting the identification information of the watcher to the terminal of the specified presentity and receiving a right for use of the electronic business card information, which is to be provided to the watcher, from the terminal of the specified presentity, upon a request for the electronic business card information of the specified presentity from the watcher,
    wherein (c) is performed when the right for use of the electronic business card information, which is to be provided to the watcher, is received from the terminal of the specified presentity.

5. The method of claim 4, further comprising (e) setting a call between the terminal of the watcher and the terminal of the specified presentity upon a request for connection of a call to the terminal of the specified presentity from the terminal of the watcher.

6. The method of claim 4, wherein (a) comprises:
    (a1) receiving the electronic business card information from the terminal of the specified presentity, the electronic business card information including a title of the specified presentity, identification of the terminal of the specified presentity, and whether a process of assigning the right for use of the electronic business card information to the watcher is to be used; and
    (a2) publishing the received electronic business card information on the open service gateway, using an open presence and availability interface.

* * * * *